(12) United States Patent
Fuse (10) Patent No.: US 7,773,315 B2
(45) Date of Patent: Aug. 10, 2010

(54) LASER OPTICAL DEVICE

(75) Inventor: Keiji Fuse, Osaka (JP)

(73) Assignees: Sumitomo Electric Industries, Ltd., Osaka (JP); Sumitomo Electric Hardmetal Corp., Hyogo (JP)

( * ) Notice: Subject to any disclaimer, the term of this patent is extended or adjusted under 35 U.S.C. 154(b) by 358 days.

(21) Appl. No.: 11/883,367

(22) PCT Filed: Sep. 21, 2006

(86) PCT No.: PCT/JP2006/318767

§ 371 (c)(1),
(2), (4) Date: Jul. 31, 2007

(87) PCT Pub. No.: WO2007/034887

PCT Pub. Date: Mar. 29, 2007

(65) Prior Publication Data

US 2008/0212185 A1  Sep. 4, 2008

(30) Foreign Application Priority Data

Sep. 22, 2005  (JP)  .............................. 2005-276010
Jul. 25, 2006  (JP)  .............................. 2006-201870

(51) Int. Cl.
*G02B 9/00*  (2006.01)
*G02B 5/18*  (2006.01)
*G02B 3/02*  (2006.01)

(52) U.S. Cl. ........................ 359/754; 359/558; 359/708; 359/719

(58) Field of Classification Search ................ 359/754, 359/558, 708, 719, 796, 797
See application file for complete search history.

(56) References Cited

U.S. PATENT DOCUMENTS

| 6,356,341 B1 * | 3/2002 | Murakami et al. | 355/67 |
| 6,710,293 B2 * | 3/2004 | Liu et al. | 219/121.73 |
| 7,282,706 B2 * | 10/2007 | Russell et al. | 250/288 |
| 2004/0165268 A1 * | 8/2004 | Turunen | 359/558 |
| 2005/0127049 A1 * | 6/2005 | Woeste et al. | 219/121.61 |
| 2006/0057502 A1 * | 3/2006 | Okada et al. | 430/313 |

FOREIGN PATENT DOCUMENTS

| JP | 61-286083 | 12/1986 |
| JP | 5-188318 | 7/1993 |
| JP | 9-61610 | 3/1997 |
| JP | 2001-62758 | 3/2001 |
| JP | 2004-252275 | 9/2004 |

OTHER PUBLICATIONS

International Preliminary Report on Patentability and Written Opinion of the International Searching Authority, issued in corresponding International Patent Application No. PCT/JP2006/318767, mailed Oct. 31, 2006.

* cited by examiner

*Primary Examiner*—Jack Dinh
(74) *Attorney, Agent, or Firm*—McDermott Will & Emery LLP (57) ABSTRACT

In a laser optical device including a beam shaping optical system 3 for shaping a laser beam 2 into a predetermined cross-sectional intensity distribution and converging the light and an image formation optical system 6 for forming an image of a shaped beam 4 shaped and converged through the beam shaping optical system 3, the image formation optical system 6 is made up of an objective lens system 8 having a negative focal length placed ahead of a focal plane 7 of the beam shaping optical system 3 and an imaging lens system 9 placed behind the objective lens system 8.

8 Claims, 10 Drawing Sheets

**INCIDENCE BEAM
INTENSITY DISTRIBUTION
(DISPLAY OF ☐12mm AREA)**

FIG. 5

PHASE DISTRIBUTION OF DOE
(DISPLAY OF ☐12mm AREA)

FIG. 6 (b)

INTENSITY DISTRIBUTION
AT DOE FOCAL POINT (VIRTUAL IMAGE)
(DISPLAY OF □1mm)

INTENSITY DISTRIBUTION OF IMAGE PLANE (DISPLAY OF □5mm)

LASER OPTICAL DEVICE

RELATED APPLICATIONS

This application is the U.S. National Phase under 35 U.S.C. §371 of International Application No. PCT/JP2006/318767, filed on Sep. 21, 2006, which in turn claims the benefit of Japanese Application No. 2005-276010, filed on Sep. 22, 2005, and Japanese Patent Application No. JP 2006-201870, filed on Jul. 25, 2006, the disclosures of which Applications are incorporated by reference herein.

TECHNICAL FIELD

This invention relates to a laser optical device applied to the technical field of laser machining.

BACKGROUND ART

Development of a high-output laser system intended for machining application is remarkable and practical use of the high-output laser system moves forward in various industrial fields from cutting and welding in manufacturing of steel and automobiles to fine drilling of electronic parts, annealing of liquid crystal and semiconductor devices, etc. This is largely owing to higher output of a laser beam and dramatic improvement of performance, quality, and stability.

As the cross-sectional intensity distribution of a laser beam, a Gaussian distribution (single mode) is mainstream. This has a feature that light can be converged up to the theoretical limit (diffraction limit) through a lens. The needs for a uniform intensity distribution and any desired intensity distribution responsive to a purpose rather than the non-uniform Gaussian intensity distribution also increase with the diversification of laser machining applications.

A superposition system of cutting the section of a laser beam into a large number of pieces lengthwise and crosswise and superposing the cut beams at predetermined positions by an optical system for averaging is available as means for providing a uniform cross-sectional intensity distribution; for example, a kaleidoscope or an integrator corresponds to it. Although the integrator can uniform the intensity to some extent by dividing and superposing the section of a laser beam by the structure of a polyhedron, it is known that the intensity falls into degradation like a spike if a laser light source excellent in coherence is used.

On the other hand, an aspherical beam homogenizer and a diffractive beam homogenizer are available as an intensity uniforming system without dividing and superposing a laser beam. In the former aspherical beam homogenizer, the refraction angle of each light beam is controlled by an aspheric surface so as convert a Gaussian light beam density distribution into a uniform distribution. In this case, the aspherical beam homogenizer has a feature that interference does not occur and high uniformity can be obtained because the refraction angle is controlled so that the light beams do not cross; on the other hand, the aspherical beam homogenizer has the disadvantage in that only a uniform beam circular in cross section can be provided because the aspheric surface is rotationally symmetric with the optical axis as the center rotation axis.

In contrast, the latter diffractive beam homogenizer is provided by applying a diffractive optical element (DOE) as a homogenizer. The DOE is an optical element using a diffraction phenomenon of light by forming the optical element on a surface with a relief microstructure pixelated crosswise in micron units rather than using geometrical optics of refraction, etc. It is applied not only to laser machining, but also to optical communications, etc., because of directly controlling the phase of light; applications of beam splitting, beam shaping, and beam homogenizing are possible in laser machining.

DISCLOSURE OF THE INVENTION

Problems to be Solved by the Invention

As described above, the diffractive beam homogenizer has the advantage that it can provide not only a uniform beam circular in cross section, but also uniform beams in various forms in cross section such as a square and a rectangle by controlling the phase of light and utilizing the diffraction phenomenon of light; on the other hand, the diffractive beam homogenizer has the disadvantage in-that the intensity easily becomes non-uniform due to figure errors of the pixilated structure, provided through the microfabrication of the structure.

Although there are various factors of figure errors of DOEs, a step error (pixel height difference) most affects the homogenization characteristic. If the step error exists in microfabrication, zeroth-order light appears. It means no diffraction by DOE and it passes through straightly. The zeroth-order light proceeds as a collimated beam and interferes with diffraction light, thereby degrading the uniform distribution of the homogenized diffraction light.

Figure 2:
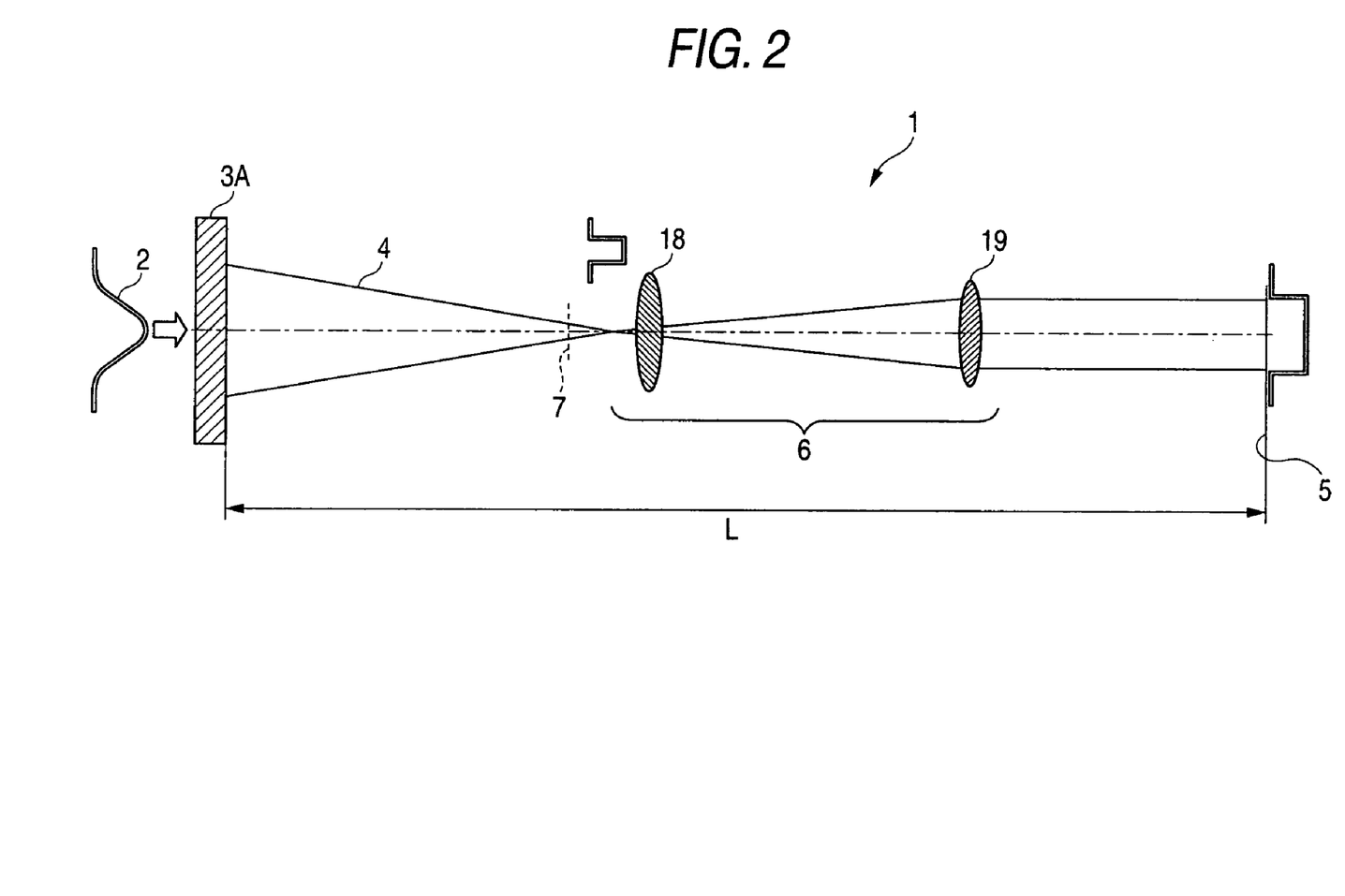
FIG. 2 is a drawing to show the schematic configuration of a laser optical device according to a comparison example of the invention.

Then, to prevent worsening of the uniforming performance of the diffractive beam homogenizer accompanying the interference with the zeroth-order light mentioned above, it is possible to use a laser optical device 1 including a diffractive beam homogenizer 3A for shaping a laser beam 2 into a uniform cross-sectional intensity distribution and an enlargement optical system 6 for enlarging a shaped beam 4 shaped as it passes through the homogenizer 3A at a predetermined magnification and forming a beam image on an image plane, for example, as shown in FIG. 2.

In the laser optical device 1, the homogenizer 3A has functions of not only shaping the laser beam 2 of Gaussian distribution into a uniform intensity distribution square in cross section, but also converging the light.

The enlargement optical system 6 is made up of an objective lens system 18 having a positive focal length placed behind a focal plane 7 of the diffractive beam homogenizer 3A and an imaging lens system 19 placed behind the objective lens system 18.

Thus, the shaped beam 4 uniformed as it passes through the homogenizer 3A is made incident on the objective lens system 18 in the proximity of the focal plane 7 and is enlarged at a predetermined magnification and then passes through the imaging lens system 19 and arrives at an image plane 5 at a predetermined distance from the imaging lens system.

Thus, if the homogenizer 3A is provided with the light converging function for once converging diffraction light and the image formed on the focal plane 7 of the homogenizer 3A is enlarged through the enlargement optical system 6, the relative intensity of the zeroth-order light to the diffraction light can be suppressed in the interference between the diffraction light converged and proceeding and the zeroth-order light proceeding as collimated light, so that the degradation of the uniform distribution of the diffraction light caused by the interference can be prevented.

However, in the laser optical device 1 shown in FIG. 2, the objective lens system 18 having a positive focal length is placed behind the focal plane 7 of the homogenizer 3A and thus the shaped beam 4 shaped into a uniform intensity distribution converges behind the focal plane 7 of the homogenizer 3A and a beam of an extremely small spot is made incident on the objective lens system 18. Since the objective lens system 18 has a positive focal length, a beam further converges in the objective lens system 18.

Thus, it is also feared that a surface coating (AR coating, etc.,) of the lenses making up the objective lens system 18 may be damaged by the beam 4 converged at a very high energy density and that the lens materials may be discolored particularly in a short wavelength beam in an ultraviolet region.

Since the laser optical device 1 shown in FIG. 2 adopts the objective lens system 18 having a positive focal length, the objective lens system 18 must be placed behind the focal plane 7 of the diffractive beam homogenizer 3A. Thus, the laser optical device also has the disadvantage in that the distance between the homogenizer 3A and the objective lens system 18 becomes long and full length L of the laser optical device 1 becomes large.

FIG. 2 illustrates the case where the objective lens system 18 behind the diffractive beam homogenizer 3A and the imaging lens system 19 further placed behind the objective lens system 18 make up the enlargement optical system 6 for enlarging the shaped beam 4 at a predetermined magnification and forming a beam image on the image plane, but the lens systems 18 and 19 may make up an equal magnification optical system for forming an image of the shaped beam 4 on the image plane at an equal magnification or a reduction optical system for reducing the shaped beam 4 and forming an image of the shaped beam 4 on the image plane.

That is, the above-mentioned problem is caused by the fact that the objective lens system 18 placed on the incidence side of the enlargement optical system 6 (the left of FIG. 2) has a positive focal length. Therefore, the above-mentioned problem also applies to the case where the image formation optical system made up of the objective lens system 18 and the imaging lens system 19 has a function of making the shaped beam 4 the same size or reducing the shaped beam 4 rather than enlarging the shaped beam 4 as a whole.

It is therefore an object of the invention to make it possible to prevent damage to or degradation of an objective lens system forming a part of an enlargement optical system for enlarging for a laser optical device for enlarging a laser beam shaped into a specific cross-sectional intensity distribution and converged at a predetermined magnification and forming a beam image and shorten the full length of the laser optical device.

It is also an object of the invention to make it possible to prevent damage to or degradation of an objective lens system forming a part of an image formation optical system for image formation for a laser optical device for forming an image of a laser beam shaped into a specific cross-sectional intensity distribution and converged and shorten the full length of the laser optical device.

Means for Solving the Problems

To accomplish the object, according to a first aspect of the invention, the following technical means is provided:

According to the first aspect of the invention, a laser optical device includes a beam shaping optical system for shaping a laser beam into a predetermined cross-sectional intensity distribution and converging the light and an enlargement optical system for enlarging a shaped beam shaped and converged through the beam shaping optical system at a predetermined magnification and forming a beam image, characterized in that the enlargement optical system includes an objective lens system having a negative focal length placed ahead of a focal plane of the beam shaping optical system and an imaging lens system placed behind the objective lens system.

According to the laser optical device according to the first aspect of the invention, the objective lens system having a negative focal length is placed ahead of the focal plane, so that the shaped beam shaped into a uniform intensity distribution is made incident on the objective lens system in a state in which the cross-sectional area of the shaped beam before the shaped beam arrives at the focal plane is comparatively large. Since the objective lens system has a negative focal length, the shaped beam incident on the objective lens system has the cross-sectional area further enlarged and the shaped beam does not converge in the objective lens system.

Thus, the surface coating of the lenses making up the objective lens system is not damaged by the beam converged at a high energy density and the lens materials are not discolored in a short wavelength beam in an ultraviolet region and damage to the lenses can be effectively prevented.

In the laser optical device according to the invention, the objective lens system having a negative focal length is placed ahead of the focal plane of the beam shaping optical system, so that the distance between the beam shaping optical system and the objective lens system can be shortened and thus the full length of the laser optical device can be shortened.

In the laser optical device according to the invention, any laser beam shaping method and any cross-sectional shape of the post-shaped beam can be adopted as the beam shaping optical system; preferably the beam shaping optical system can be implemented as a homogenizing optical system for shaping a laser beam whose cross-sectional intensity distribution is a Gaussian distribution into an almost uniform intensity distribution.

A diffractive beam homogenizer or an aspherical beam homogenizer can be adopted as the homogenizing optical system. As described above, to use the diffractive beam homogenizer, interference between converged and proceeding diffraction light and zeroth-order light proceeding as collimated light is suppressed, so that degradation of the uniform distribution of the homogenized diffraction light caused by the interference can also be prevented.

In the first aspect of the invention, the image formation optical system made up of the objective lens system and the imaging lens system is the enlargement optical system having the function of enlarging a shaped beam, but may be an equal magnification optical system for forming an image of a shaped beam at an equal magnification (second aspect of the invention) or may be a reduction optical system having a function of reducing a shaped beam (third aspect of the invention).

That is, the first to third aspects of the invention are characterized by the fact that a laser optical device includes a beam shaping optical system for shaping a laser beam into a predetermined cross-sectional intensity distribution and converging the light and an image formation optical system for forming an image of a shaped beam shaped and converged through the beam shaping optical system, and that the image formation optical system includes an objective lens system having a negative focal length placed ahead of a focal plane of the beam shaping optical system and an imaging lens system placed behind the objective lens system.

In a seventh aspect of the invention, if an optical system containing a diffractive beam splitter for splitting the shaped beam into a plurality of beams is adopted as the image formation optical system implemented as the enlargement optical system, the equal magnification optical system, or the reduction optical system having the objective lens system and the imaging lens system, a laser optical device that can form an image of a uniform beam at a plurality of points simultaneously can be provided.

Advantages of the Invention

As described above, according to the first to seventh aspects of the invention, damage to or degradation of the objective lens system forming a part of the enlargement optical system, the equal magnification optical system, or the reduction optical system can be prevented and the full length of the laser optical device can be shortened.

According to the invention, damage to or degradation of the objective lens system forming a part of the image formation optical system can be prevented and the full length of the laser optical device can be shortened.

DESCRIPTION OF REFERENCE NUMERALS

1 Laser optical device
2 Laser beam
3 Beam shaping optical system
3A Diffractive beam homogenizer
4 Shaped beam
5 Image surface
6 Enlargement optical system (image formation optical system)
7 Focal plane
8 Objective lens system (negative focal length)
9 Imaging lens system
18 Objective lens system (positive focal length)
19 Imaging lens system

BEST MODE FOR CARRYING OUT THE INVENTION

Figure 1:
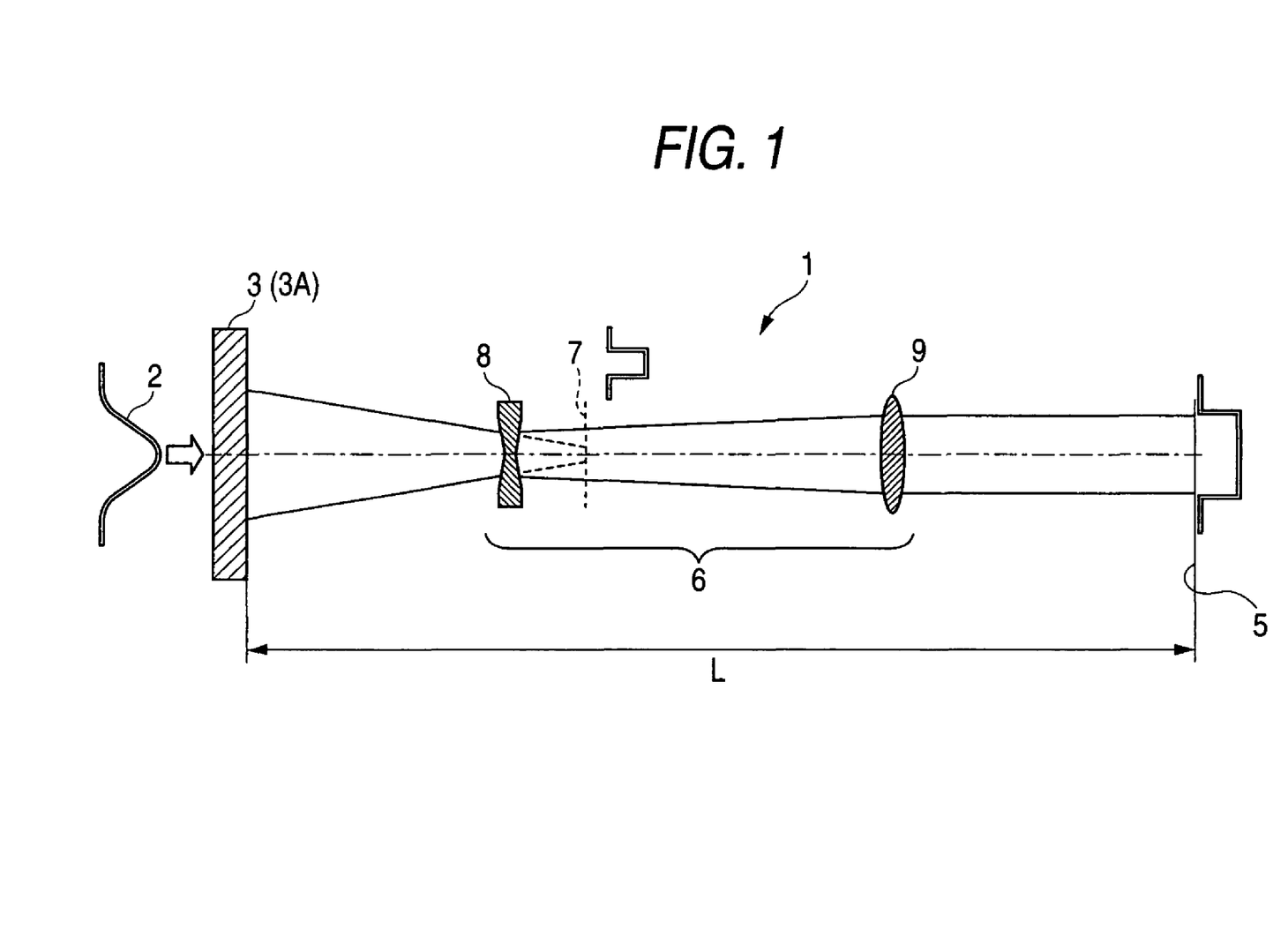
FIG. 1 is a drawing to show the schematic configuration of a laser optical device according to an embodiment of the invention.

An embodiment of the invention will be discussed below based on the accompanying drawings:

FIG. 1 shows the schematic configuration of a laser optical device 1 according to an embodiment of the invention.

As shown in FIG. 1, the laser optical device 1 of the embodiment includes a beam shaping optical system 3 for shaping a laser beam having a wavelength of 532 μm, for example, incident from a laser oscillator (not shown) into a predetermined cross-sectional intensity distribution and converging the light and an enlargement optical system 6 for enlarging a shaped beam 4 shaped through the beam shaping optical system 3 at a predetermined magnification and forming a beam image on an image plane 5.

The beam shaping optical system 3 is implemented as a homogenizing optical system for shaping the laser beam 2 whose cross-sectional intensity distribution is a Gaussian distribution into a uniform intensity distribution, more specifically, a diffractive beam homogenizer 3A.

The diffractive beam homogenizer 3A is provided by applying a diffractive optical element (DOE) as a homogenizer and has a function of causing a diffraction phenomenon of light to occur in the presence of a relief microstructure pixilated crosswise in micron units formed on a surface, thereby converting the laser beam 2 of a Gaussian distribution into a shaped beam 4 which is rectangular in cross section and has a uniform cross-sectional intensity distribution, for example.

The homogenizer 3A also has a light converging function of lessening the cross-sectional area of the shaped beam 4 toward the propagating direction; specifically the laser beam 2 of a Gaussian distribution circular in cross section having a diameter of the order of several millimeters to several ten millimeters is shaped into a uniform square section measuring several millimeters or less square on a focal plane 7 and is converged.

The enlargement optical system 6 is made up of an objective lens system 8 placed behind the homogenizer 3A and an imaging lens system 9 further placed behind the objective lens system 8. The objective lens system 8 has a negative focal length and is placed ahead of the focal plane 7 of the homogenizer 3A.

The expression "ahead of" is used to mean positioning on the side of the homogenizer 3A (the left of FIG. 1) from the focal plane 7. FIG. 1 draws one concave lens to functionally represent the objective lens system 8 having a negative focal length; in fact, however, the objective lens system 8 is implemented as a multi-element lens. The multi-element lens may contain a positive lens to remove aberration.

The imaging lens system 9 is placed behind the objective lens system 8 at a predetermined distance from the objective lens system 8 so as to provide a predetermined magnification (in the example in FIG. 1, five times), and the shaped beam 4 passing through the imaging lens system 9 becomes collimated light and proceeds backward and is applied to the image plane 5. Specifically, assuming that the cross-sectional shape of the shaped beam 4 on the focal plane 7 of the homogenizer 3A is a square section measuring 500 μm square, the beam is enlarged to 2.5 mm square on the image plane 5.

FIG. 1 draws one convex lens to functionally represent the imaging lens system 9, but the imaging lens system 9 may be implemented as a multi-element lens.

Although not shown, if a mask is placed on the image plane 5 of the laser optical device 1 and it is projected on a workpiece by an optical system, laser machining of taperless fine drilling, etc., is made possible. Further, if the mask size or shape is changed, the machining size or shape can also be changed.

According to the laser optical device 1 according to the configuration described above, the laser beam 2 of a Gaussian distribution incident from a laser oscillator is converted into the shaped beam 4 square in cross section and having a uniform intensity distribution by the diffractive beam homogenizer 3A, and the shaped beam 4 passes through the objective lens system 8 placed ahead of the focal plane 7 of the homogenizer 3A and the imaging lens system 9 placed behind the objective lens system 8 and is applied to the image plane 5.

At this time, the objective lens system 8 having a negative focal length is placed ahead of the focal plane 7 of the homogenizer 3A, so that the shaped beam 4 of a uniform intensity distribution can be made incident on the objective lens system 8 in a state in which the cross-sectional area of the shaped beam before the shaped beam arrives at the focal plane 7 is comparatively large.

Since the objective lens system 8 has a negative focal length, the shaped beam 4 incident on the objective lens system 8 has the cross-sectional area further enlarged and arrives at the imaging lens system 9 and does not converge in the objective lens system 8. Thus, unlike the comparison example shown in FIG. 2, the surface coating of the lenses making up the objective lens system 8 is not damaged by the beam 4 converged at a high energy density and the lens materials are not discolored in a short wavelength beam in an ultraviolet region.

Therefore, damage to the lenses making up the objective lens system 8 can be effectively prevented and the life of the laser optical device 1 can be made long. Sine there is no fear of convergence of a beam in the objective lens system 8, use of a higher-output power laser is made possible and the application range of the laser optical device 1 can also be widened.

Further, in the laser optical device 1 of the embodiment, the objective lens system 8 having a negative focal length is placed ahead of the focal plane 7 of the homogenizer 3A, so that the distance between the homogenizer 3A and the objective lens system 8 can be shortened as compared with the comparison example shown in FIG. 2 and thus full length L of the laser optical device 1 can be shortened.

Since the objective lens system 8 having a negative focal length can be made up of a plurality of lenses whose curvature is not much large, it can be easily manufactured and the number of lenses can also be made comparatively small.

The embodiment described above is illustrative and not restrictive. The scope of the invention is defined by the claims, and all changes that fall within meets and bounds of the claims, or equivalence of such meets and bounds are also contained in the scope of the invention.

For example, the wavelength of the laser used with the laser optical device 1 of the invention is arbitrary and the invention can also be applied to light sources of any wavelength of infrared, visible, or ultraviolet.

Not only the diffractive beam homogenizer 3A, but also an aspherical beam homogenizer can be adopted as the beam shaping optical system 3, and a device for shaping a laser beam into any desired cross-sectional distribution shape as well as the homogenizer is also contained.

Further, in the embodiment in FIG. 1, the case where the objective lens system 8 behind the diffractive beam homogenizer 3A and the imaging lens system 9 further placed behind the objective lens system make up the enlargement optical system 6 for enlarging the shaped beam 4 at a predetermined magnification and forming a beam image on the image plane is illustrated, but the lens systems 8 and 9 can also make up an equal magnification optical system for forming an image of the shaped beam 4 on the image plane at an equal magnification or a reduction optical system for reducing the shaped beam 4 and forming an image of the shaped beam 4 on the image plane.

If a diffractive beam splitter for splitting the shaped beam 4 into a plurality of beams is interposed between the objective lens system 8 and the imaging lens system 9 as shown in an example described later, a laser optical device 1 that can form an image of a uniform beam at a plurality of points simultaneously can be provided.

EXAMPLES

More detailed specific examples (examples) of the laser optical device 1 designed based on the invention will be discussed.

First Example

Figure 3:
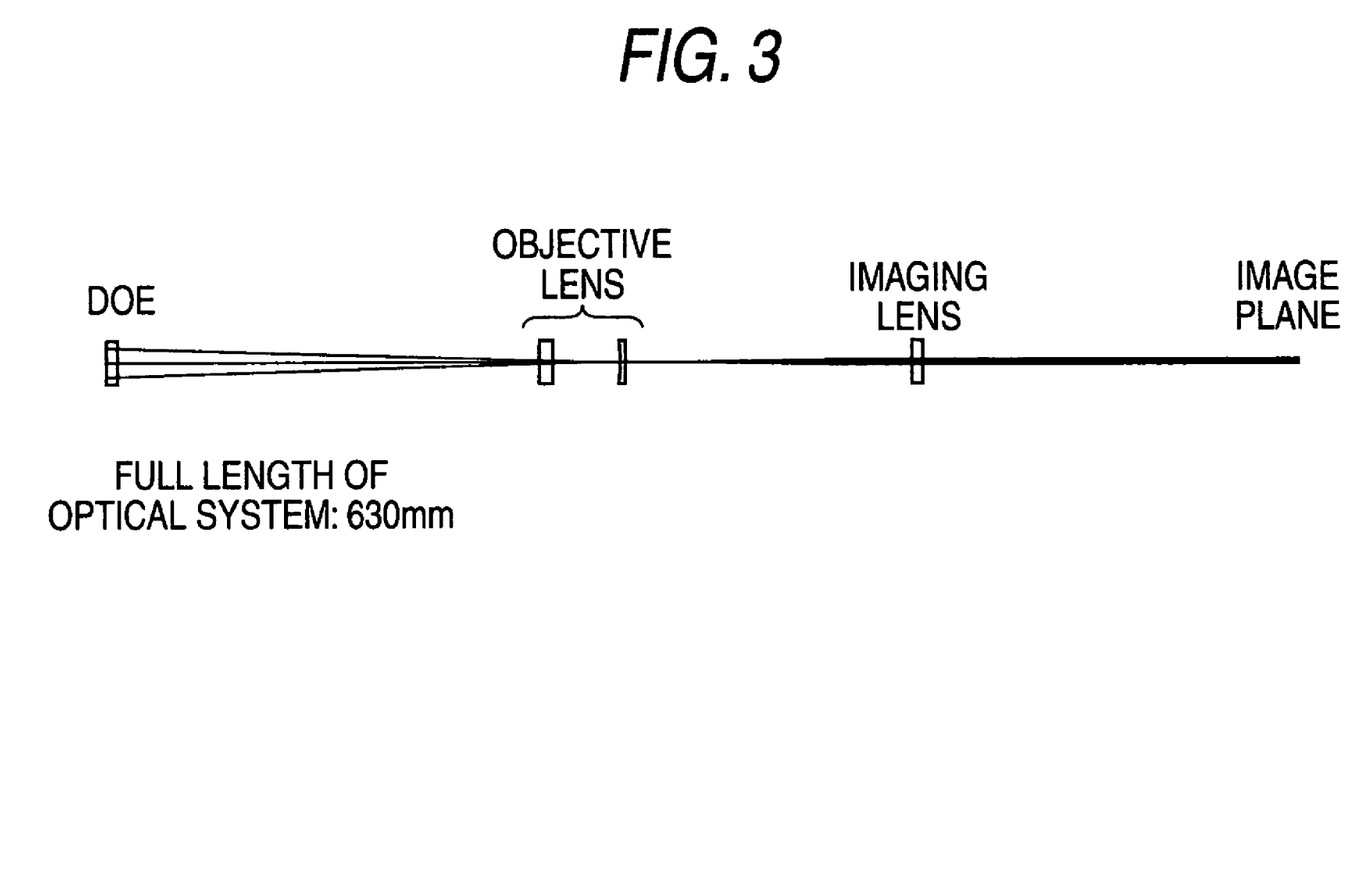
FIG. 3 is a drawing to show the schematic configuration of a laser optical device according to a first example of the invention.

The laser condition, the specifications of a DOE homogenizer, the specifications of an objective lens system, and the specifications of an imaging lens system in a first example are as listed below. A drawing to show the schematic configuration in the first example is as shown in FIG. 3. The full length of an optical device 1 of the first example is 630 mm; the full length of the optical device 1 in the related art adopting the objective lens system having a positive focal length is 780 mm. Therefore, the full length of the optical device 1 of the first example was able to be shortened about 20% as compared with that in the related art.

Figure 4:
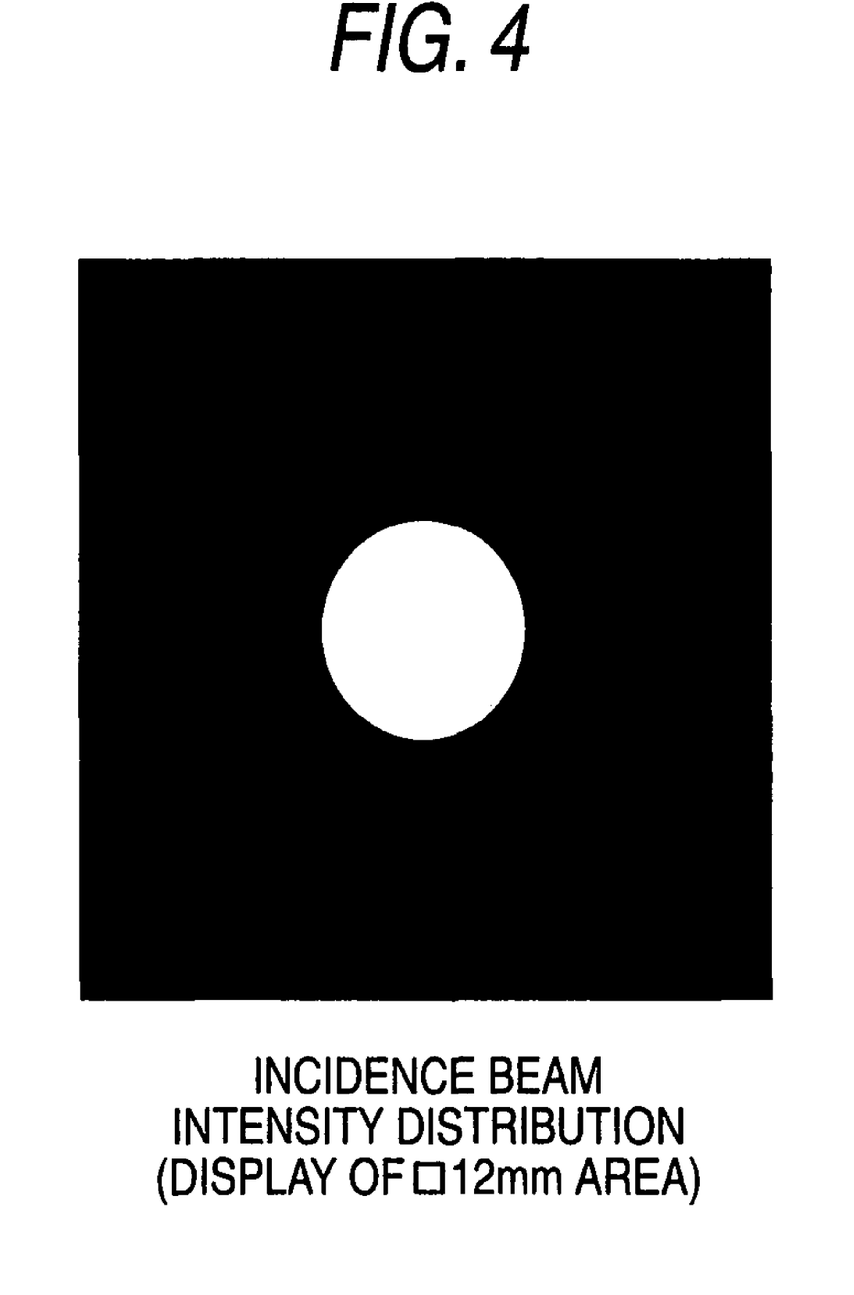
FIG. 4 shows an incidence beam intensity distribution of the laser optical device according to the first example.
Figure 5:
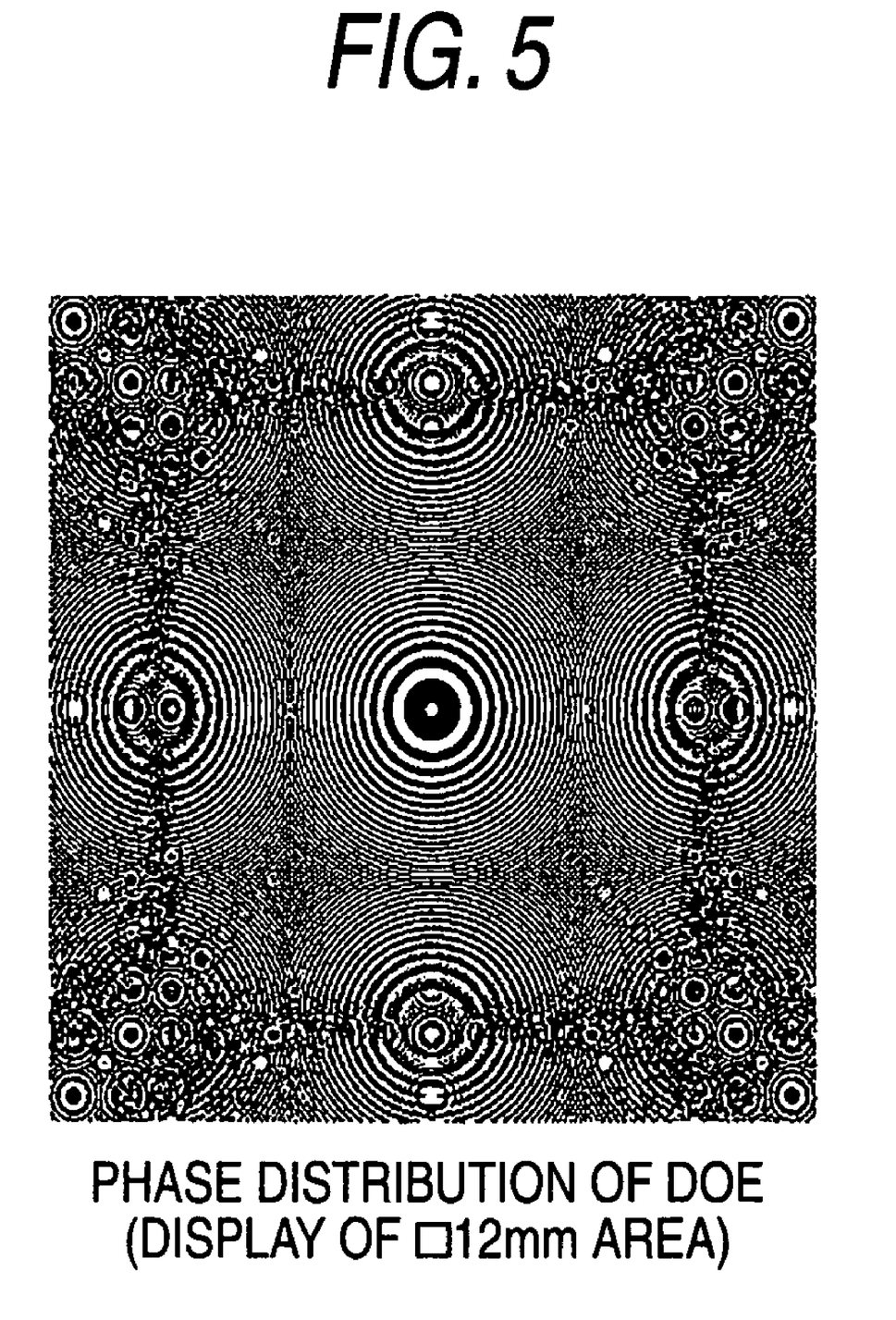
FIG. 5 shows a phase distribution of DOE adopted in the first example.

<Laser Condition>
Wavelength: 532 nm
Mode: $TEM_{00}$
$1/e^2$ beam diameter: $\phi 6$ mm
Angle of divergence: 0 mrad
<DOE Homogenizer>
Substrate: Quartz
Size: $\phi 20$ mm×5 mm thick
Focal length: 300 mm
Uniform beam size: 500 μm×500 μm
Phase: 16 steps
Pixel size: 6 μm×6 μm
Number of pixels: 2000×2000
Pattern area size: 12 mm×12 mm
<Objective Lens System>
Composition: A set of two spherical lenses
Magnification: ×5
Focal length: −40 mm
First lens glass material: Quartz
First lens diameter: $\phi 20$ mm
First lens center thickness: 6.8 mm
First lens—first surface curvature radius: 67.4 mm (convex)
First lens—second surface curvature radius: 41.0 mm (concave)
Second lens glass material: Quartz
Second lens diameter: $\phi 20$ mm
Second lens center thickness: 2.9 mm
Second lens—first surface curvature radius: 27.7 mm (concave)
Second lens—second surface curvature radius: 229.0 mm (concave)
Distance between DOE and objective lens: 225 mm
Distance between first and second lenses: 37.2 mm
<Imaging Lens System>
Focal length: 200 mm
Glass material: Quartz
Diameter: 20 mm Center thickness: 5 mm
First surface curvature radius: 183.5 mm (convex)
Second surface curvature radius: 183.5 mm (convex)
Distance between objective and imaging lenses: 151.7 mm
Distance between imaging lens and image plane: 196.45 mm FIG. 4 shows an incidence beam intensity distribution of the laser optical device 1 according to the first example (displays an area measuring 12 mm square). FIG. 5 shows a phase distribution of DOE adopted in the example and also displays an area measuring 12 mm square.

Figure 6:
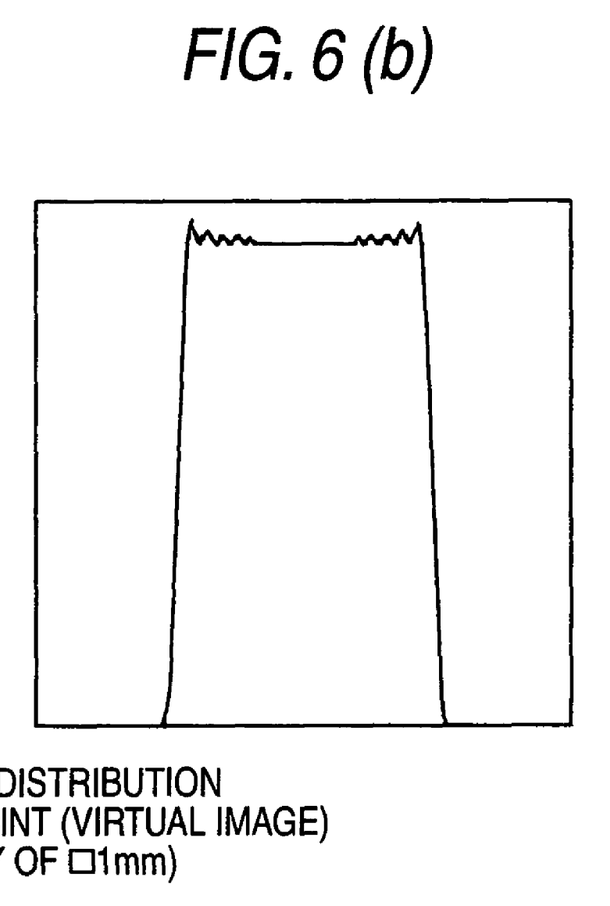
FIG. 6 shows an intensity distribution at the DOE focal point of the laser optical device according to the first example.

FIG. 6 shows an intensity distribution at the DOE focal point of the laser optical device 1 according to the first example (virtual image: Display of an area measuring 1 mm square); FIG. 6(a) is two-dimensional gray scale display of the intensity distribution and FIG. 6(b) shows a cross-sectional profile in the lateral direction of the intensity distribution.

Figure 7:
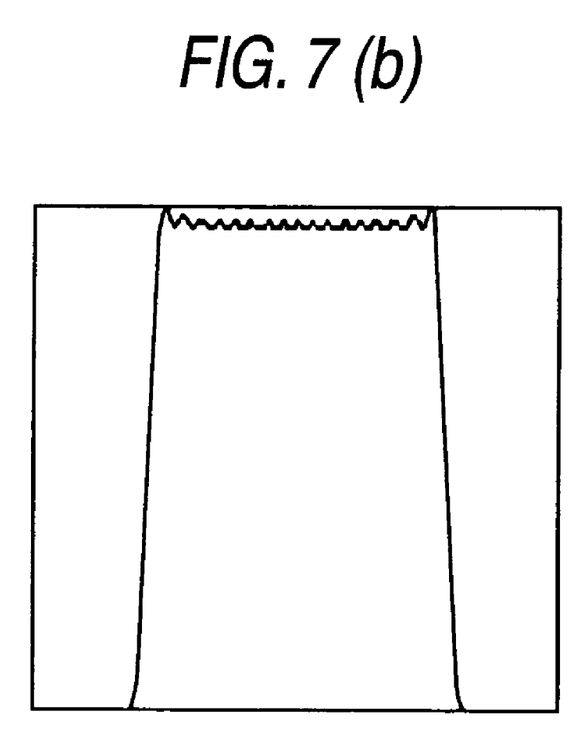
FIG. 7 shows an intensity distribution on the image plane of the laser optical device according to the first example.

FIG. 7 shows an intensity distribution on the image plane of the laser optical device 1 according to the first example (displays an area measuring 5 mm square); FIG. 7(a) is two-dimensional gray scale display of the intensity distribution and FIG. 7(b) shows a cross-sectional profile in the lateral direction of the intensity distribution.

In the laser optical device 1 of the first example according to the configuration described above, damage to the surface coating of the lenses making up the objective lens system, discoloring of the lens materials, etc., did not occur.

Second Example

Figure 8:
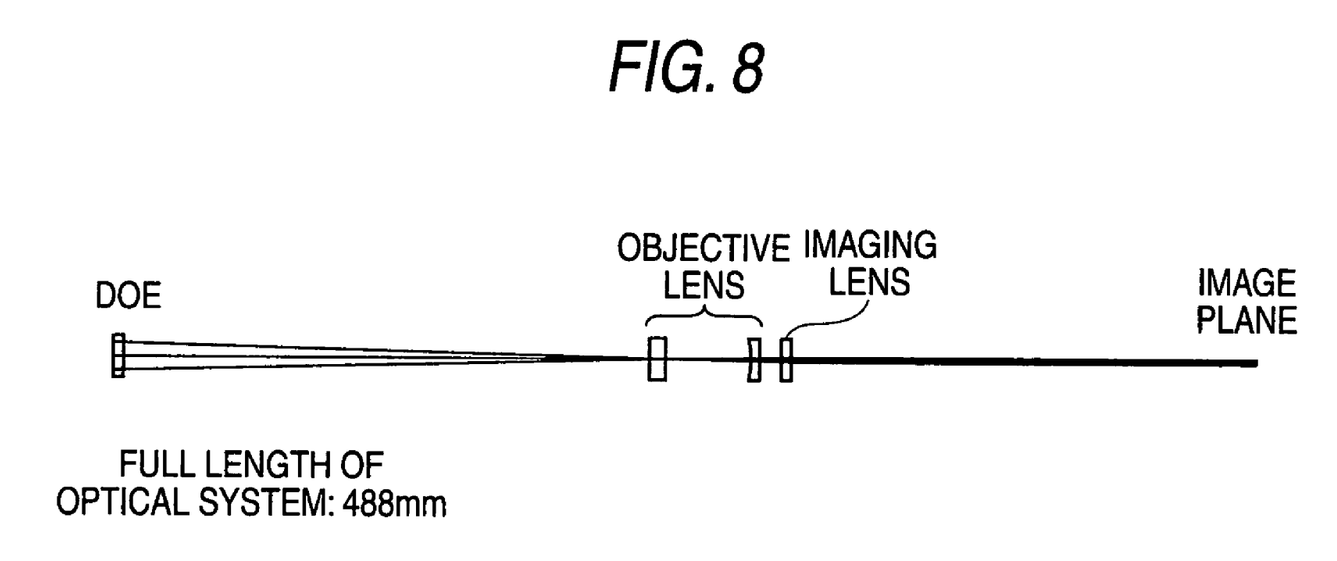
FIG. 8 is a drawing to show the schematic configuration of a laser optical device 1 according to a second example of the invention.

FIG. 8 is a drawing to show the schematic configuration of a laser optical device 1 according to a second example of the invention.

In the second example, as shown in FIG. 8, the distance between an objective lens and an imaging lens was changed and was shortened from 151.7 mm to 10 mm as compared with that in the first example (FIG. 3). The laser condition, the specifications of a DOE homogenizer, etc., other than the distance are similar to those in the first example. Consequently, the full length of the optical device 1 of the second example became 488 mm and was able to be made shorter than that in the first example.

In the laser optical device 1 of the second example according to the configuration described above, damage to the surface coating of the lenses making up the objective lens system, discoloring of the lens materials, etc., did not occur.

The intensity distribution on the image plane in the second example was similar to that in the first example. However, in the second example, the wavefront on the image plane has a slight divergence (the wavefront curvature radius is about 400 mm); while, in the first example, the wavefront becomes closer to be a flat (the wavefront curvature radius is about 1000 mm).

Third Example

Figure 9:
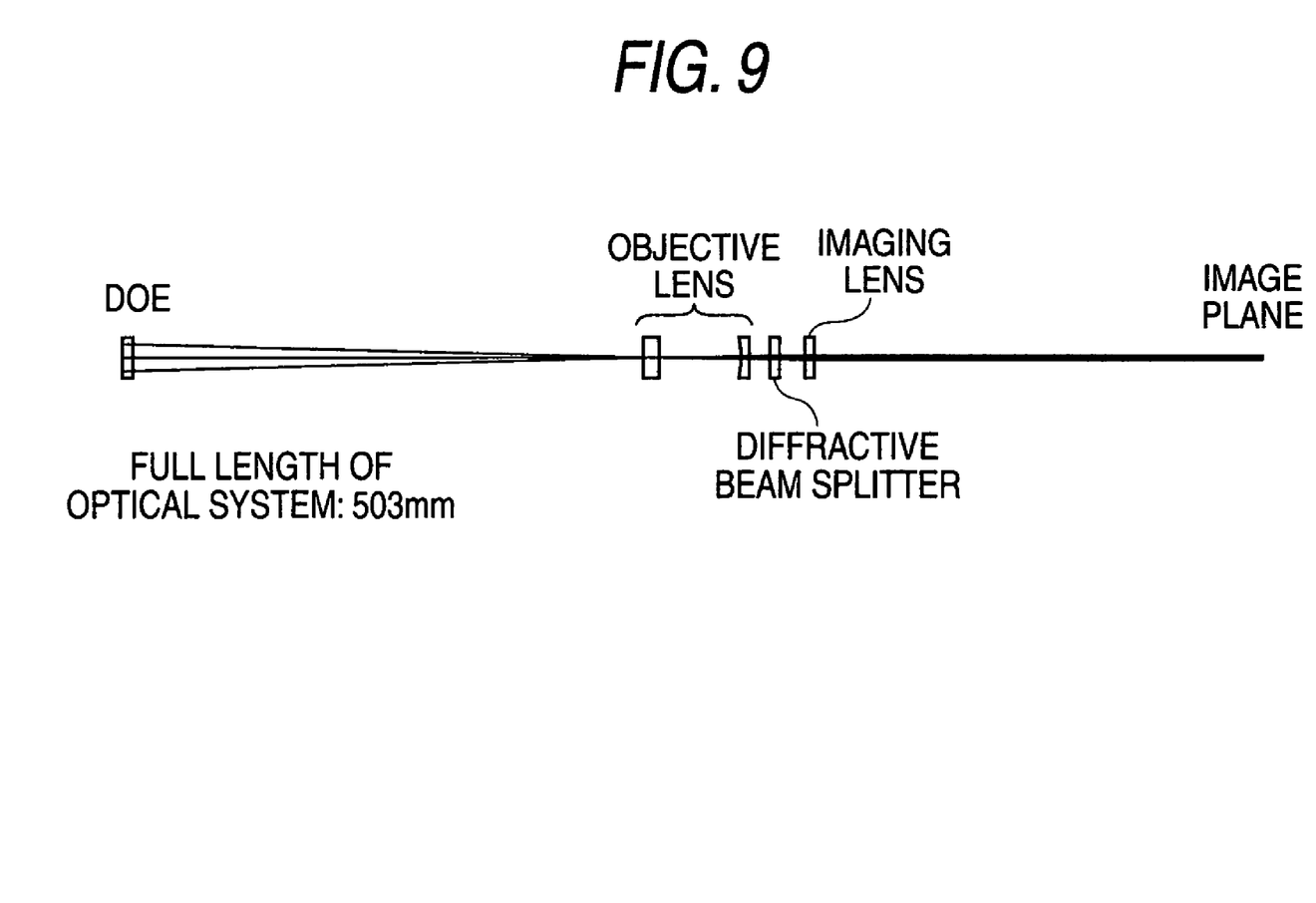
FIG. 9 is a drawing to show the schematic configuration of a laser optical device 1 according to a third example of the invention.

FIG. 9 is a drawing to show the schematic configuration of a laser optical device 1 according to a third example.

In the third example, as shown in FIG. 9, a diffractive beam splitter for splitting a beam into two beams is placed between an objective lens and an imaging lens. Accordingly, the laser optical device 1 for forming an image of a uniform beam at two points simultaneously was able to be provided. The full length of the optical device 1 became 503 mm.

The specifications of the splitter are as listed below. The laser condition, the specifications of a DOE homogenizer, etc., other than the specifications of the splitter are similar to those in the first example. However, not only a simple 1×2 splitter as in the example, but also any of elements having various splitting patterns can be adopted as the diffractive beam splitter.

Figure 10:
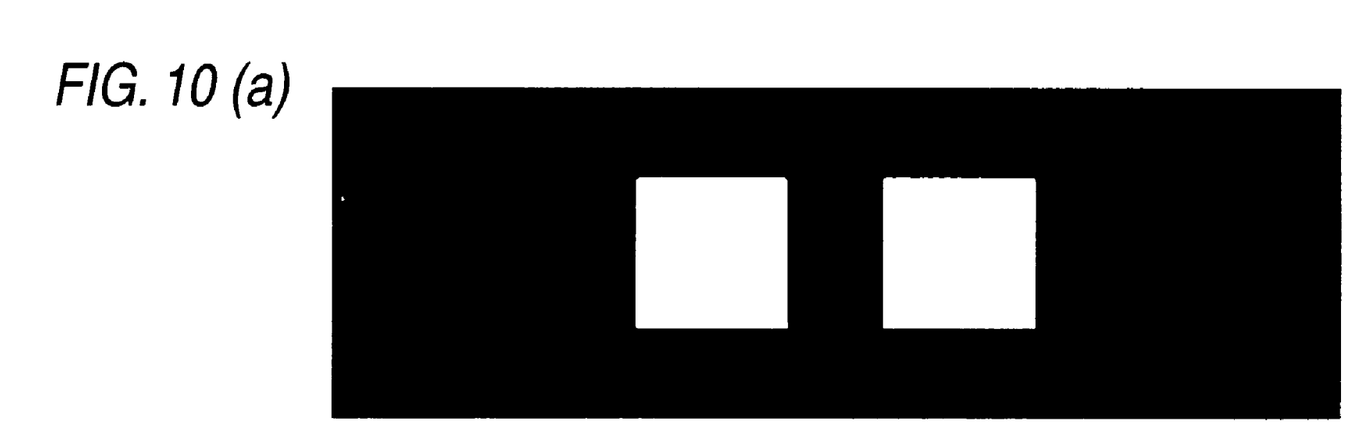
FIG. 10 shows an intensity distribution on the image plane of the laser optical device according to the third example.

<Diffractive Beam Splitter>
Substrate: Quartz
Size: φ20 mm×5 mm thick
Number of split beams: Two
Surface pattern: Line and space
Phase: Binary steps
Period: 40 μm
Distance between objective lens and splitter: 10 mm
Distance between splitter and imaging lens: 10 mm FIG. 10 shows a intensity distribution on the image plane of the laser optical device 1 according to the third example (displays a 15 mm×5 mm area); FIG. 10(a) is two-dimensional gray scale display of the intensity distribution and FIG. 10(b) shows a cross-sectional profile in the lateral direction of the intensity distribution.

In the laser optical device 1 of the third example according to the configuration described above, damage to the surface coating of the lenses making up the objective lens system, discoloring of the lens materials, etc., did not occur.

In FIG. 10, beams having low intensity appear on the outside of two uniform beams at the center; the beams are high-order noise light. The high-order noise light is caused by using a simple line and space patterned splitter. A surface pattern optimized on design in a more advanced manner is adopted, whereby the high-order noise light can be converted into low noise.

While the invention has been described in detail with reference to the specific embodiments, it will be obvious to those skilled in the art that various changes and modifications can be made without departing from the spirit and the scope of the invention.

This application is based on Japanese Patent Application (No. 2005-276010) filed on Sep. 22, 2005 and Japanese Patent Application (No. 2006-201870) filed on Jul. 25, 2006, which are incorporated herein by reference.

The invention claimed is:

1. A laser optical device comprising:
   a beam shaping optical system for shaping a laser beam into a predetermined cross-sectional intensity distribution and converging the light; and
   an image formation optical system for forming an image of the laser beam shaped and converged through said beam shaping optical system,
   wherein said image formation optical system comprises an objective lens system having a negative focal length placed ahead of a focal plane of said beam shaping optical system and an imaging lens system placed behind said objective lens system.

2. The laser optical device as claimed in claim 1, wherein said image formation optical system is an enlargement optical system for enlarging the laser beam shaped and converged through said beam shaping optical system at a predetermined magnification and forming a beam image.

3. The laser optical device as claimed in claim 1, wherein said image formation optical system is an equal magnification optical system for forming an image of the laser beam shaped and converged through said beam shaping optical system at an equal magnification.

4. The laser optical device as claimed in claim 1, wherein said image formation optical system is a reduction optical system for reducing the laser beam shaped and converged through said beam shaping optical system at a predetermined magnification and forming a beam image.

5. The laser optical device as claimed in claim 1, wherein said beam shaping optical system is implemented as a homogenizing optical system for shaping the laser beam whose cross-sectional intensity distribution is a Gaussian distribution into an almost uniform intensity distribution.

6. The laser optical device as claimed in claim 5, wherein the homogenizing optical system is implemented as a diffractive beam homogenizer.

7. The laser optical device as claimed in claim 5, wherein the homogenizing optical system is implemented as an aspherical beam homogenizer.

8. The laser optical device as claimed in claim 1, wherein said image formation optical system having the objective lens system and the imaging lens system contains a diffractive beam splitter for splitting the laser beam into a plurality of laser beams.

* * * * *